May 22, 1956
R. CARUOLO
2,746,659
BUMPER CARRIER
Filed Nov. 12, 1953
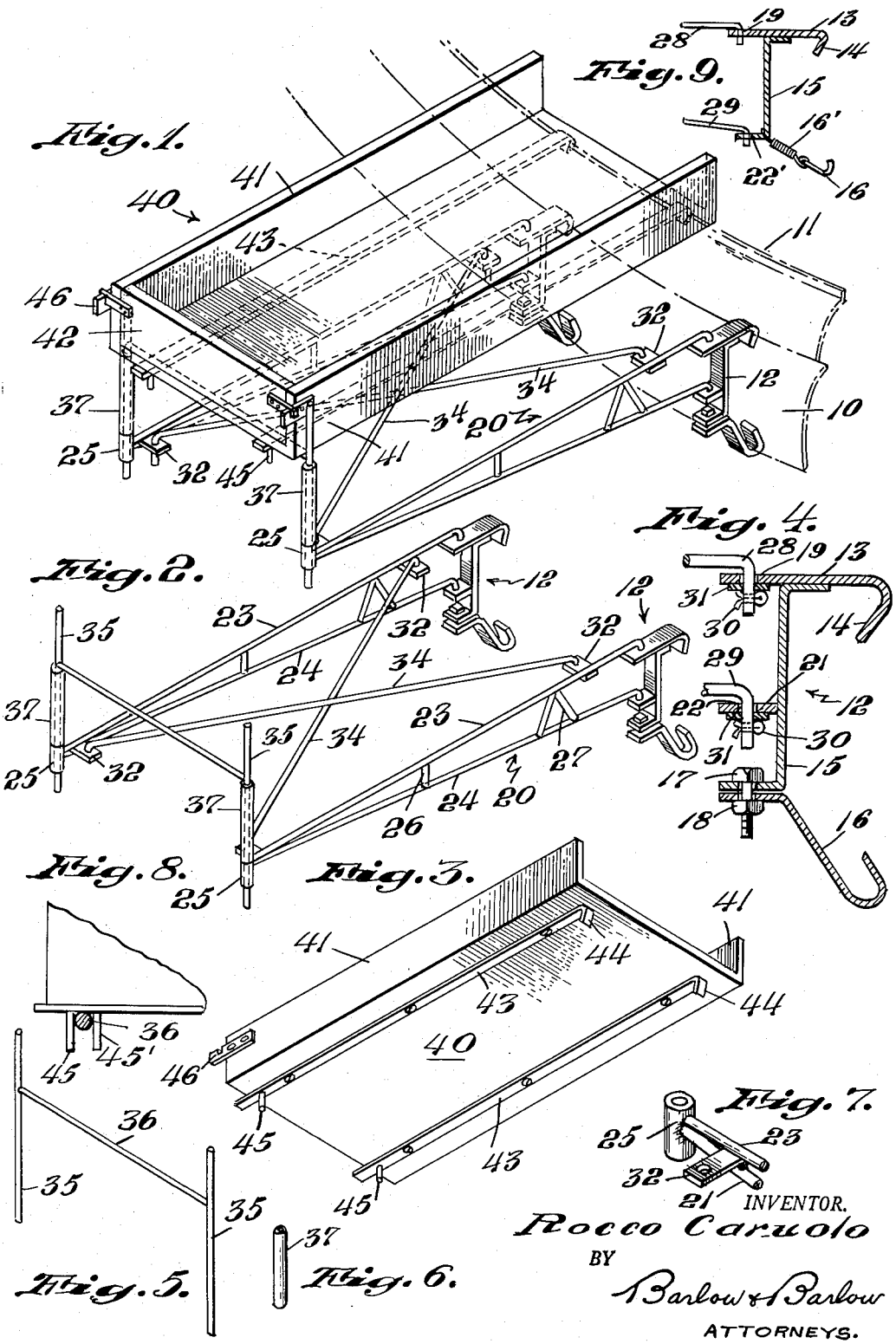
INVENTOR.
Rocco Caruolo
BY
Barlow & Barlow
ATTORNEYS.

United States Patent Office 2,746,659
Patented May 22, 1956

2,746,659
BUMPER CARRIER

Rocco Caruolo, Providence, R. I.

Application November 12, 1953, Serial No. 391,609

8 Claims. (Cl. 224—42.07)

This invention relates to a carrier attachment for an automobile, particularly an attachment adapted to be clamped to the rear bumper of an automobile.

Luggage racks which extend from the rear bumper of an automobile have long been known in the art. These racks were originally intended for use with automobiles of their day in which no trunk space was provided within the body of the automobile. The modern automobile, however, has a trunk space within the body thereof, which space, while being entirely adequate for carrying luggage, is generally not large enough to accept bulky articles which have at least one dimension larger than that found in the trunk compartment.

It is therefore one of the objects of this invention to provide a carrier attachment for an automobile which will effectively enlarge the luggage compartment of an automobile.

Another object of this invention is to provide a carrier attachment which may be rigidly attached to the bumper of an automobile and yet be quickly detached therefrom.

A still further object of the invention is the provision of a carrier attachment for an automobile which may be partially disassembled so that the bracket arms thereof will swing parallel to the bumper.

A still further object of the invention is to provide a carrier attachment for an automobile which may be conveniently stored in the trunk compartment of an automobile when it is not in use.

With these and other objects in view, the invention consists of certain novel features of construction as will be more fully described and particularly pointed out in the appended claims.

In the accompanying drawings:

Figure 1 is a perspective view of the complete carrier attachment affixed to the bumper of an automobile with a box receptacle in place;

Figure 2 is a perspective view of the carrier attachment with the box receptacle removed;

Figure 3 is a perspective bottom view of the box receptacle showing the attaching rods;

Figure 4 is a sectional view of the clamping hooks used in connection with the carrier attachment;

Figure 5 is a perspective view of the H-shaped rods disposed at the rear end of the carrier;

Figure 6 is a perspective view of one of the spacer tubes associated with the H-shaped rods of Figure 5;

Figure 7 is a perspective view on an enlarged scale of the end of the arms of the carrier attachment;

Figure 8 is a partial end view of the box showing two depending pins which engage the horizontal rod of Figure 5 to prevent longitudinal movement of the box in both directions;

Figure 9 is a sectional view of a modified form of clamping hook.

In proceeding with this invention, I provide two brackets which include hook-shaped ends for attachment to a bumper. I pivotally relate to each of these brackets a supporting arm and place at the end of the arms an H-shaped structure which is adapted to hold them spaced apart. I additionally provide suitable cross bracing between the arms and mount a box-like receptacle between the transverse member of the H-shaped structure and the bottom ridge of the trunk compartment. Suitable adjustment means are provided in the bracket that clamps to the bumper so that it may be adapted to various size bumpers, and adjustable means are provided on the H-shaped structure so that it may be raised and lowered to accommodate varying heights of the lower edge of the trunk compartment with relation to the bumper.

Referring now to the drawings, 10 designates a bumper of an automobile which is provided with the usual trunk door opening having a lower lip 11. Affixed to the bumper are two clamps generally designated 12. Each of these clamps (Fig. 4) includes an upper plate 13 with a hook-like end 14 and a socket hole 19 removed therefrom, the upper plate 13 having depending therefrom a bearing plate 15. This bearing plate 15 is preferably welded to the upper plate 13 at varying distances from the hook end 14 so as to accommodate various sizes of bumpers, the bearing plate 15 having welded thereto an attachment plate 21 with a socket hole 22 therein. Bolted to the lower end of the bearing plate 15 is a lower hook member 16 which is adapted solely to prevent the bracket from swinging outwardly away from the bumper and which is adjustable in vertical height with relation to the upper plate 13 by means of a bolt 17 having a nut 18 threadingly engaged therewith. As shown in Figure 9, the clamps 12 may be modified by eliminating plate 21 and changing the hook 16. In this embodiment, the hole 22' is made integral with the plate 15 and the hook 16 is attached thereto by a tension element 16' such as a helical spring, the element 16' extending so as to accommodate various heights of bumpers.

The carrier arms generally designated 20 preferably comprise two rod-like members 23 and 24 which are disposed in a general V-shaped relationship, the vertex of the V forming the outer end thereof which has welded thereto a socket 25. Suitable bracing means such as 26 and 27 are provided between the two arms 23 and 24, and the spaced ends of said arms are turned at right angles so as to form L-shaped ends 28 and 29. These L-shaped ends are adapted to be received in the holes 19 and 22, respectively, and are secured therein by means of cotter pins 30 which bear upon washers 31. Lugs 32 having holes drilled therein are affixed to the arms 23. These lugs are adapted to receive generally U-shaped bracing members 34 which are disposed between the arms as an X-shaped frame to provide lateral stability. At the end of each of the arms 20 there is received in sockets 25 vertical rods 35 which form part of an H-shaped structure having a transverse member 36 welded therebetween. To adjustably space the height of the transverse member 35 above the arms 20, cylindrical tubes 37 are provided which are adapted to slide over the end of the vertical rods 35 and bear between the upper edge of socket 25 and the lower edge of the transverse rod 36.

The structure just described, which is completely illustrated in Figure 2, may be readily adapted as a unit to extend the lengthwise dimension of a trunk. As such, it is suitable for carrying such items as lumber or other lengthy objects, one end of which may rest within the trunk and be supported along its longitudinal extent by means of the transverse member 36. However, should it be desired to carry smaller articles, a box-like frame generally designated 40 (Figure 3) may be provided, which includes two side walls 41 and a removable end wall 42. Affixed along the bottom of the box 40 are two straps 43 which may be provided with hook ends 44, the hook ends being adapted to engage the lower edge 11 of the trunk opening and prevent shifting movement to the rear. Pins 45 (Figure 3) are additionally provided and extend from the plates 43 in a manner to engage the outside edge of a horizontal member 36, thus preventing any tendency for box 40 to move forward. As shown in Figure 8, additional pins 45' may be provided which will prevent shifting movement to the rear and in this case hooks 44 may be eliminated. The removable end wall 42 of the box 40 may be simply attached to the side walls 41 by means of notched mating plates 46 in a manner well understood.

As thus described, the completed structure including the box 40 may be readily adapted to carry a variety of small articles exterior to the trunk compartment. Should it be desired to discontinue use of the carrier device, the box 40 may be removed along with the bracing rods 34 and H-shaped structure consisting of vertical rods 35 and 36 whereupon the two arms 20 may be swung parallel to the bumper of the automobile and strapped thereto ready for further use. Alternatively the arms 20 may be removed completely by extracting the cotter pins 30 and removing the arms thus leaving only the brackets 12 attached. Additionally the complete structure including the arms 20 and brackets 12 may be removed from the bumper 10 of the automobile.

I have thus described a carrier attachment for an automobile which can be put to many uses either with or without the box receptacle. As such, it may aid the travelling motorist in carrying his excess equipment.

I claim:

1. In combination with an automobile having a rear bumper and a lip adjacent to said bumper, a carrier frame secured to said bumper and extending therefrom in a generally horizontal direction, said frame having a cross member at the outer end portion thereof, a platform resting at one end portion thereof on said lip and at the other end portion thereof on said cross member, and means secured to said platform interengaging with said lip and said cross member securing said platform to said lip and to said cross member.

2. In combination as set forth in claim 1 wherein said means comprises a pair of spaced hooks at the inner end portion of said platform engaging said lip and spaced pins depending from said platform engaged with the side of said cross member distant from said lip.

3. In combination as set forth in claim 1 wherein said frame has a pair of spaced uprights at the outer end thereof between which said platform is received, and said cross member is secured to said uprights.

4. In combination with an automobile having a rear bumper and a lip adjacent to said bumper, a carrier frame secured to said bumper and extending therefrom in a generally horizontal direction, said frame having a cross member at the outer end portion thereof, a platform resting at one end portion thereof on said lip and at the other end portion thereof on said cross member, and a pair of spaced pins projecting from said platform straddling said cross member whereby to prevent shifting of said platform in the longitudinal direction thereof.

5. In combination as set forth in claim 4 wherein said frame has a pair of spaced uprights at the outer end thereof, said cross member extending between and secured to said uprights at a location thereon substantially beneath the upper end thereof, said platform extending between said uprights with the sides thereof closely adjacent said uprights.

6. A carrier for attachment to the rear bumper of an automobile comprising a pair of clamp brackets adapted to be attached in spaced relation to each other to said bumper, an arm pivotally secured to each bracket to extend therefrom in a generally horizontal direction and substantially parallel to each other, a cross member extending between said arms at the other end thereof and secured thereto, and tie members extending between said arms and loosely secured thereto, said tie members extending diagonally between said arms whereby to prevent pivotal movement of said arms relative to said brackets.

7. A carrier as set forth in claim 6 wherein said automobile has a lip extending generally parallel to said bumper and said arms each have a vertical socket at the outer end thereof, a rod in each of said sockets extending upwardly therefrom, said cross member being secured to said rods, and a spacer element on each of said rods at a position between said socket and said cross member whereby to adjust the height of said cross member relative to said lip.

8. A collapsible carrier for attachment to the rear bumper of an automobile comprising a pair of clamp brackets adapted to be detachably secured in spaced relation to said bumper, each of said brackets having an opening thereon, an arm extending generally horizontal from each of said brackets and with the adjacent end portion of the arm detachably received in the opening in said bracket, each of said arms having a vertical socket at the other end thereof and a pair of spaced openings, a rod detachably received in each socket and extending upwardly therefrom, a cross member extending between said rods and secured thereto, and a pair of tie members extending diagonally between said arms and detachably received in the openings in said arms, whereby said arms, rods, and tie members may be detached from said bracket and from each other to collapse said carrier into individual sections.

References Cited in the file of this patent

UNITED STATES PATENTS

| 2,541,244 | Hack | Feb. 13, 1951 |
| 2,554,776 | Comeau | May 29, 1951 |
| 2,593,908 | Monteverde | Apr. 22, 1952 |
| 2,672,264 | Steven | Mar. 16, 1954 |

FOREIGN PATENTS

| 19,472 | France | Nov. 10, 1914 |